United States Patent [19]

Maher et al.

[11] Patent Number: 5,204,862
[45] Date of Patent: Apr. 20, 1993

[54] TDM SLOT MUTING METHOD AND APPARATUS

[75] Inventors: John W. Maher, Woodstock; James T. Rydberg, Lombard, both of Ill.

[73] Assignee: Motorola Inc., Schaumburg, Ill.

[21] Appl. No.: 567,524

[22] Filed: Aug. 1, 1990

[51] Int. Cl.⁵ ............................................. H04J 3/12
[52] U.S. Cl. .................................... 370/110.1; 370/77
[58] Field of Search ............... 370/58.1, 58.2, 66, 370/67, 68.1, 62, 85.1, 13, 17, 68, 109, 110.1, 110.2, 110.3, 111, 77; 455/17, 33, 34, 53–56; 381/46, 47, 73.1, 94; 340/825.22, 825.24, 825.25

[56] References Cited

U.S. PATENT DOCUMENTS

| | | | |
|---|---|---|---|
| 4,546,470 | 10/1985 | Naylor et al. | 370/58.1 |
| 4,554,658 | 11/1985 | Marten et al. | 370/110.2 |
| 4,813,040 | 3/1989 | Futato | 370/110.1 |
| 4,945,355 | 7/1990 | Blanchette | 370/85.8 |
| 5,093,829 | 3/1992 | Maher | 370/85.8 |

Primary Examiner—Douglas W. Olms
Assistant Examiner—Alpus H. Hsu
Attorney, Agent, or Firm—Timothy W. Markison

[57] ABSTRACT

In a communications system network that comprises a plurality of communication systems and a processing multiplexer, a method and apparatus for selectively muting particular signal sources of a communication system is disclosed. In each communication system, a processing multiplexer interface module detects when a mute request is generated and injects a null audio signal into a corresponding TDM slot of a source interface bus. This process can be used to localize audio communications of a particular signal source in a communication system or may be used for individual communication system testing of its audio signal bus.

6 Claims, 4 Drawing Sheets

TDM SLOT MUTING METHOD AND APPARATUS

FIELD OF THE INVENTION

This invention relates generally to communication systems and in particular to a communication system network wherein a communication system may mute a particular TDM slot of an internal audio bus from being transmitted to the communication system network.

BACKGROUND OF THE INVENTION

Conventional communication systems (FIG. 1) and trunked communication systems (FIG. 2) generally comprise a communication resource allocator, a limited number of communication resources that may be transmitted by a limited number of repeaters, a plurality of communication units, a plurality of consoles, and may include a computer aided dispatcher (CAD). The communication resource allocator generally comprises a plurality of operator mux interface modules (OMI), a plurality of base interface modules (BIM), a plurality of audio expansion interface modules (AEI), at least one audio signal bus, a MUX common module, at least one data interface bus (not shown), and may include a CAD interface module (CIMI). Each BIM and each OMI source, as signal sources, representations of audio signals to the audio signal bus. Depending on the signal source to TDM slot assignment, the audio signal bus receives the representation of audio signals into assigned TDM slots. Some of the representations of audio signals, which may be digital audio signals, may be summed together to produce a resulting digital audio signal and placed onto the sink audio bus (not shown). The sink audio bus comprises a plurality of TDM slots, one for each of the signal destinations (BIMs and AEIs), and routes the resulting digital audio signal to the proper signal destination.

Occasionally (for example, once every 30 seconds), the communication resource allocator verifies the continuity of a TDM slot of the audio signal bus by prompting one of the signal sources, either BIM or an OMI, to transmit a test tone into its assigned TDM slot. Once the test tone is placed in the TDM bus, each of the signal sources monitors the particular TDM slot to determine if the test tone is received. If the signal sources receive the test tone, which may be any predetermined signal, continuity of that particular TDM slot is verified. The test tone is placed on the audio signal bus it is processed as any other digital audio signal, thus in order for the test tone to be muted, each of the components of the communication resource allocator contain tone detect software such that when a test tone is being transmitted in any TDM slot, the components ignore the test tone, i.e. treat it a null signal. If the components did not contain test tone detection software, the tone would pass to the signal destinations causing the tone and/or pops to present which may be offensive to some users of the system. In practice, one of the OMIs may provide the prompting for the tone testing and would assure that each TDM slot was tested.

A plurality of communication systems, conventional and/or trunked, may be operably coupled to each other via a processing multiplexer and a plurality of source and sink interface buses to form a communication system network. To substantially function within the communication system network and to function independently, each of the communication systems further comprises a processing multiplexer interface module. The processing multiplexer interface module interfaces the communication system with the processing multiplexer by sending to and receiving from the processing multiplexer digital audio signals and data. One of the functions of the processing multiplexer interface module, or ambassador interface mux interface module (AIMI), is to take the digital audio signals from each of the TDM slots of the audio signal bus and place them into a corresponding TDM slot of the source interface bus. Once the digital audio signals are placed into the source interface bus, the processing multiplexer extracts the digital audio signals from the source interface bus, processes at least some of the digital audio signals on a per communication system per signal destination basis to produce resulting digital audio signals. The resulting digital audio signals are subsequently routed to the appropriate signal destinations via the sink interface buses. For a more detailed description of a communication system network refer to co-pending patent application having Ser. No. 07/509,915.

In a communication system network, each of the communication systems still perform a continuity test of the TDM slots of the audio signal bus. However, if the test is performed as described above, the test tone would not be recognized by the AIMI and thus the AIMI would send the test tone to the processing multiplexer. Once in the processing multiplexer, the test tone would be treated as any other digital audio signal which could end up being sent to a multitude of signal destinations.

Therefore, a need exists for a method and apparatus that allows the processing multiplexer interface module to prevent undesired digital audio signals, including test tones, from being transmitted to the processing multiplexer.

SUMMARY OF THE INVENTION

These needs and others are substantially met by the TDM slot muting apparatus and method disclosed herein. In a communication system network that comprises a plurality of communication systems and a processing multiplexer, wherein each of the plurality of communication systems is operably associated with the processing multiplexer by at least one source interface bus and at least one sink interface bus. Each of the communication systems comprises a plurality of signal destinations, a plurality of signal sources, at least one audio signal bus, and a processing multiplexer interface module that performs functions to interface the communication system with the processing multiplexer. Each of the buses (the sink interface, the source interface, and the audio signal buses) is comprised of TDM time slots. Each TDM slot of the audio signal bus of the communication system contains information pertaining to the representation of audio signals produced by one of the signal sources. When it is desired that a particular representation of audio signals not be sent to the processing multiplexer, a mute request is generated which is detected by the processing multiplexer interface. Once the processing multiplexer interface module detects a mute request, it determines which of the plurality of TDM slots of the audio signal bus the mute request is for. After determining which TDM slot is to not have its contents transmitted to the processing multiplexer, the processing multiplexer interface module injects a null-audio signal into the particular TDM slot's corresponding TDM slot of the source interface bus. Thus, the processing multiplexer receives the null-audio signal while the particular TDM slot of the audio signal bus retains its contents.

In one aspect of the present invention, the mute request of a TDM slot may comprise a test tone signal. When the processing multiplexer interface module, which comprises mute request detection circuitry, detects the test tone it interprets the test tone as a mute request signal. After determining which TDM slot of the audio bus contains the test tone, the processing multiplexer interface module injects a null-audio signal into the corresponding TDM slot of the source interface bus. When the test tone transmission has stopped, the processing multiplexer interface module removes the null-audio signal such that the information contained in the TDM slot of the audio signal bus may be transmitted to the processing multiplexer.

In another aspects of the present invention, a mute request may comprise a request for muting several TDM slots at one time. In this instance, the processing multiplexer interface module injects a null-audio signal into the corresponding TDM slots of the source interface bus for each TDM slot of the audio signal bus that the mute request is for.

BEST MODE FOR CARRYING OUT THE INVENTION

Figure 1:
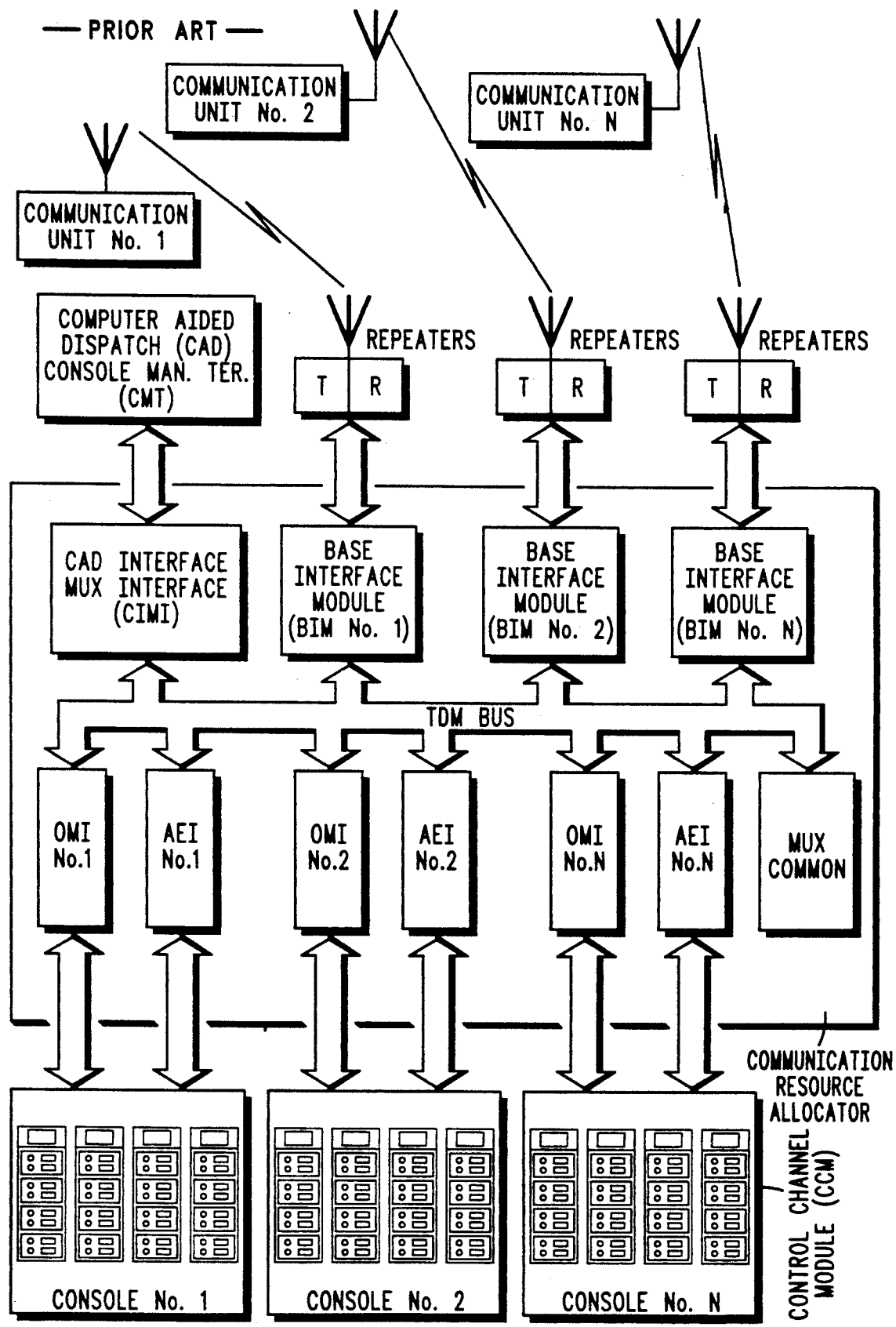
FIG. 1 illustrates a conventional communication system of the prior art.
Figure 2:
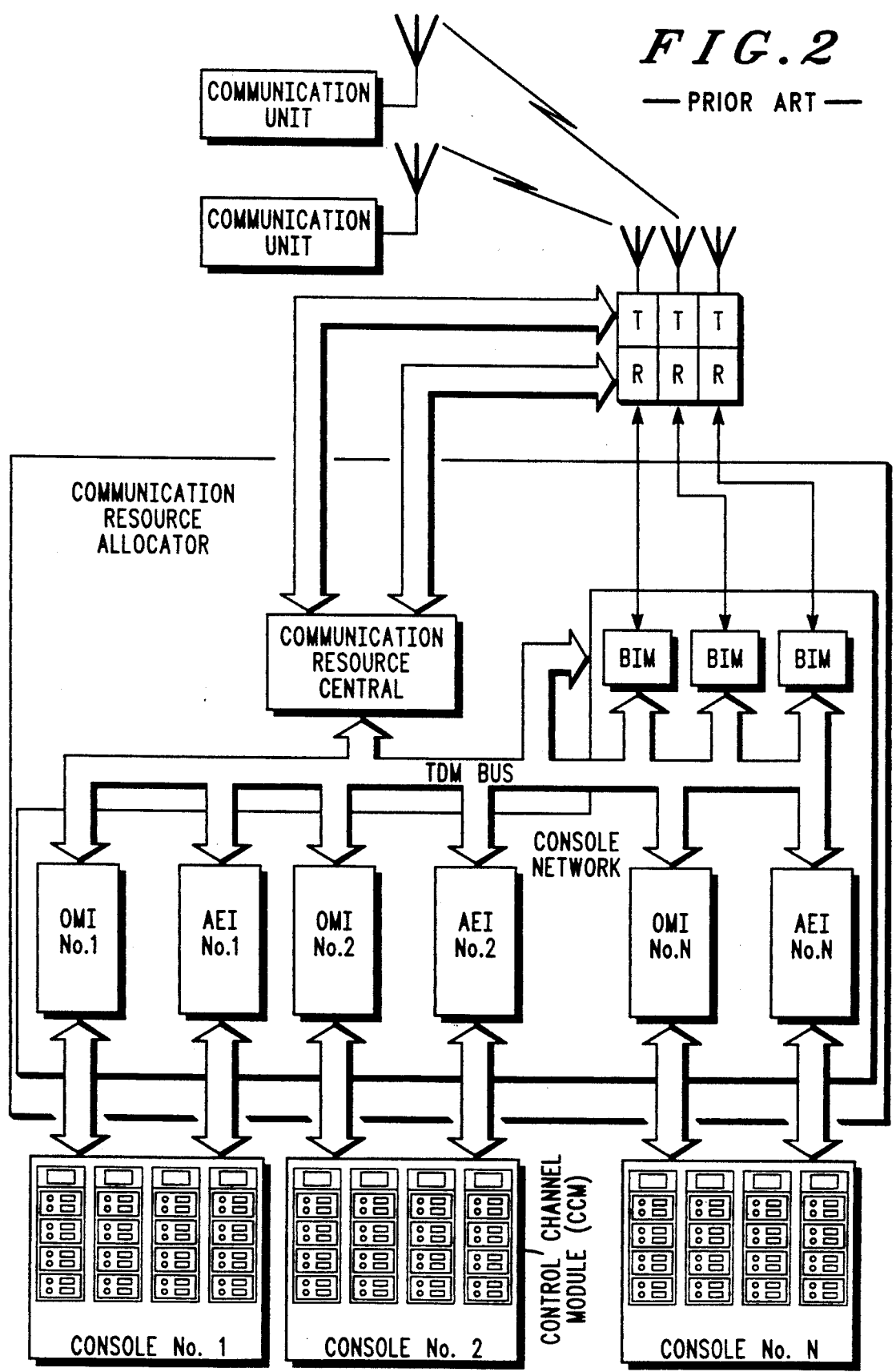
FIG. 2 illustrates a trunked communication system of the prior art.
Figure 3:
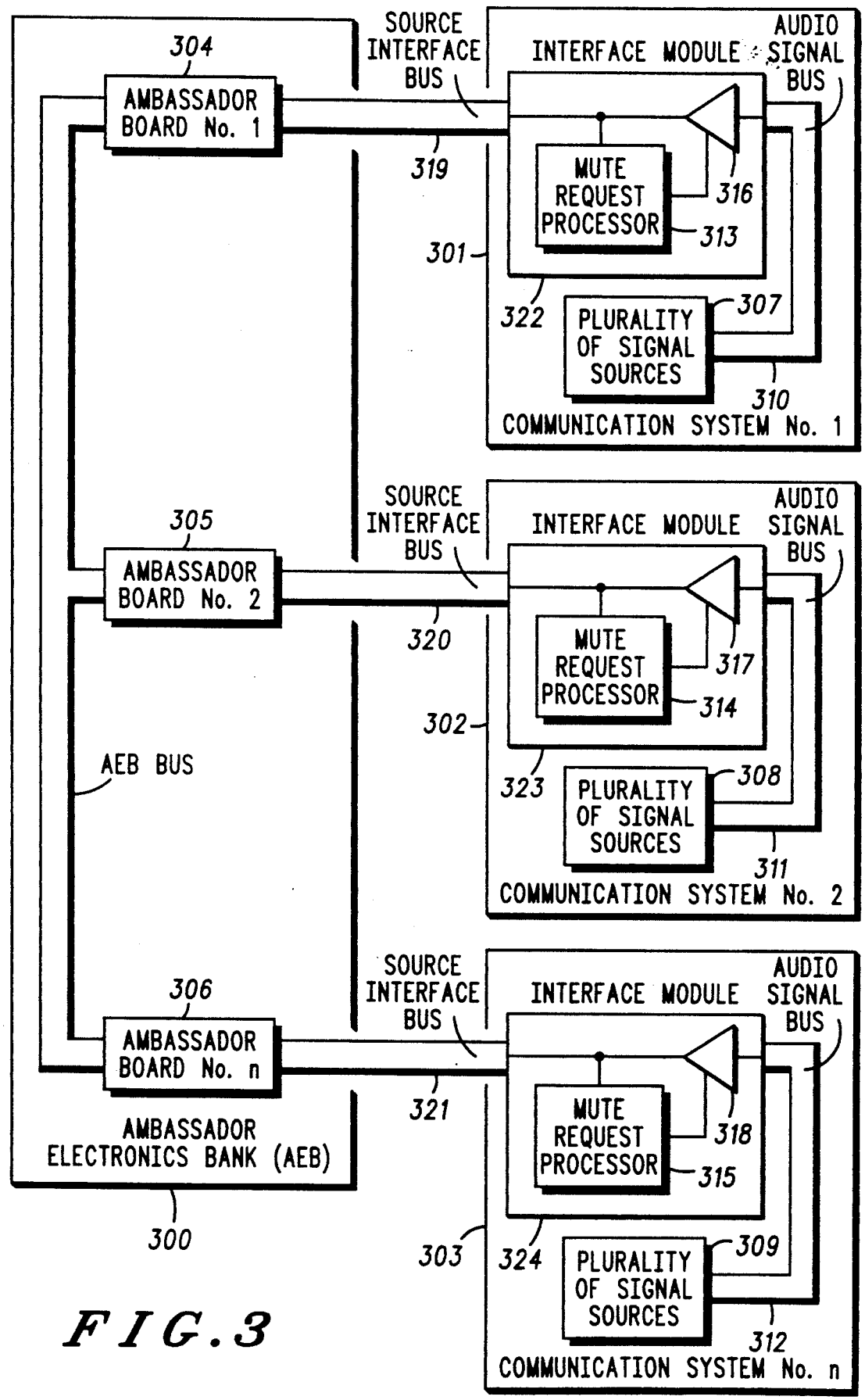
FIG. 3 illustrates a block diagram of a communication system network that incorporates the present invention.

FIG. 3 illustrates a block diagram of a communication system network that comprises a processing multiplexer, or ambassador electronics bank, (300) and a plurality of communication systems (301-303). The communication systems are connected to the ambassador electronics bank (300) via at least one interface bus (319-321) and at least one sink interface bus (not shown). Each of the communication systems (301-303) comprises a plurality of signal sources (307-309), at least one audio signal bus (310-312), and processing multiplexer interface module (322-324), wherein each of the interface modules comprise a mute request processor (313-315) and a tri state buffer device (316-318). The audio signal bus (310-312) comprises a plurality of TDM slots, wherein each TDM slot is assigned to carry a signal source's representation of audio signals. The source interface bus (319-321) comprises a plurality of TDM slots equal to the number of TDM slots in the audio signal bus such that each signal source of a communication system has an assigned TDM slot in both the audio signal bus (310-312) and the source interface bus (319-321). The best mode contemplates that each communication system will have two audio signal buses, each bus having 32 TDM slots.

Generally, the processing multiplexer interface module ((322-324) may prevent, upon receipt of a mute request, information contained in any of the TDM slots of the audio signal bus (310-312) from being placed onto the source interface bus. When a mute request is received, the mute request processor (313-315), which may be a microprocessor or reprogrammable electronic memory device, of the processing multiplexer interface module (322-324) determines which signal source (based on its TDM slot assignment) is to be preventing from having its digital audio signals routed to the processing multiplexer (300). Once the mute request processor (313-315) determines the particular TDM slot of the audio signal bus, it injects a null audio signal into the corresponding TDM slot of the source interface bus (319-321). This may be done by the use of a tri state buffer device (316-317) wherein for that particular TDM slot the tri state buffer goes into a high impedance state such that the mute request processor (313 through 315) drives that particular TDM slot. In the alternative, the mute request processor (313-315) may add or subtract a PCM signal to the information pertaining to the audio signals contained in the particular TDM slot of the audio signal bus to produce a null audio, or mute, signal. Nevertheless, the best mode contemplates injecting a digital pattern based on the encoding scheme to override any signal in the TDM slot, where the digital pattern represents the null-audio signal or zero voltage. The mute signal is then placed onto the source interface bus in the corresponding TDM slot. It is further contemplated that the mute request may be a test tone signal generated by one of the signal sources or a request by a computer aided dispatcher (not shown) to localize the audio signals of a particular signal source and may also specify several signals sources.

Figure 4:
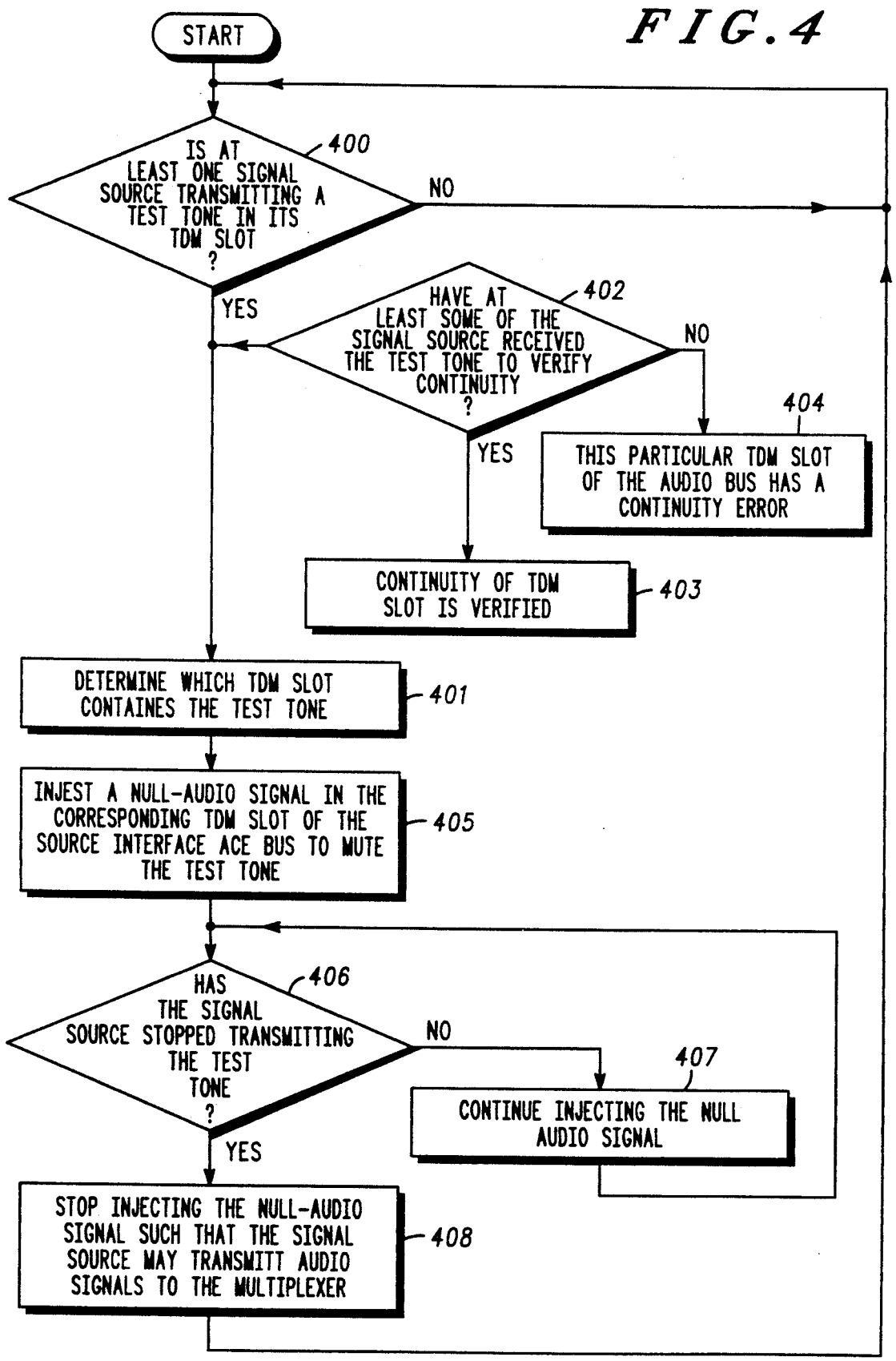
FIG. 4 illustrates a logic diagram of one possible implementation the present invention.

FIG. 4 illustrates a logic diagram of one implementation of the present invention wherein the mute request is a test tone generated by a signal source. The steps are the same whether the mute request is a test tone or a request to localize a particular audio signal except steps 402-404 are not performed for a request to localize an audio signal, thus, no separate discussion will be presented. At step 400, the processing multiplexer interface module checks to see if at least one signal source is transmitting a test tone into its assigned TDM time slot. If the processing multiplexer interface module does not detect a test tone signal in any of the TDM slots, it waits for one. While awaiting the test tone and while executing these steps, the processing multiplexer interface module performs several other interface functions as described in co-pending patent application having a Ser. No. of 07/509,915. Once the processing multiplexer interface module detects a test tone in at least one of the TDM slots (400), the process branches off into two sections. The first section is the process for muting the test tone from being transmitted to the processing multiplexer, while the second branch is the inter communication system continuity testing of the TDM slot. Considering the inter communication system continuity testing of the TDM slot first, the communication system checks to see if at least some of the signal sources receive the test tone (402). If the signal sources have not received the test tone (402), the particular TDM slot of the audio bus has a continuity error (404). If the signal sources do receive the test tone signal (402), the continuity of that particular TDM slot is verified (403). This process is repeated at step (400) for the remaining TDM slots when a new test tone is initiated.

The muting processes is performed as follows. At step (401), the processing multiplexer interface module determines which TDM slot contains the test tone. Once the particular TDM slot is determined a null-audio signal is injected into the corresponding TDM slot of the source interface bus (405). At step (406) the processing multiplexer interface module monitors the TDM slot containing the test tone and awaits for the test tone transmission to end. If the test tone transmission has not ended (406), the processing multiplexer interface module continues to inject the null-audio signal (407). When the test tone transmission has ended (406), the processing multiplexer interface module stops injecting the null-audio signal and the process repeats at step 400. The test tone transmission may end by having the signal source which initiated the test tone transmit an end of test data packet such that the AIMI is informed of the end. Another method for detecting the end of tone transmission, which may be used in conjunction with the end of test data packet, is to have a timeout, such that when a predetermined time elapses (for example 100 msecs) the AIMI stops injecting the null-audio signal.

The process described above was directed toward muting one TDM slot of the audio bus in a communication system, nevertheless, the process is equally adapted for muting multiple TDM slots. If the mute request is for several TDM slots of the audio bus to be muted, the processing multiplexer interface module simply injects null-audio signals into the corresponding TDM slots of the source interface bus.

What is claimed is:

1. In a communication system network that comprises a plurality of communication systems and a processing multiplexer, wherein each of the plurality of communication systems is operably associated with the processing multiplexer by at least one source interface bus having a plurality of TDM slots and at least one sink interface bus having a plurality of TDM slots, wherein the each of the plurality of communication systems comprises:

a plurality of signals destinations;
   a plurality of signal sources, wherein at least some of the signal sources produce representations of audio signals;
   at least one audio signal bus, operably associated with the plurality of signal sources, having a plurality of TDM slots, wherein each of the plurality of TDM slots carries information pertaining to the representation of audio signals for one of the plurality of signals sources; and
   processing multiplexer interface means, operably associated with the at least one audio signal bus and the plurality of signal sources, for placing at least some of the representations of audio signals onto the source interface bus such that the at least some of the representations of audio signals are supplied to the processing multiplexer;

wherein, for each communication system, the at least one source interface bus has a corresponding TDM slot for each of the plurality of TDM slots of the at least one audio signal bus, and wherein the processing multiplexer processes the at least some of the representations of audio signals and routes, via the sink interface bus, processed signals to at least some of the plurality of signal destinations, a method for each of the communication systems to mute representations of audio signals produced by at least one of the plurality of signal sources such that the processing multiplexer receives a mute signal instead of the representations of audio signals produced by the at least one signal source, the method comprises the steps of:

a) detecting a mute request;
   b) determining which of the plurality of TDM slots of the at least one audio signal bus the mute request is for to produce a determined TDM slot; and
   c) injecting a null-audio signal into the determined TDM slot's corresponding TDM slot of the at least one source interface bus with negligible affects on the information pertaining to the representation of audio signals contained within the determined TDM slot.

2. The method of claim 1 further comprises the step of:

d) ceasing to inject the null-audio signal in the corresponding TDM slot of the at least one source interface bus when the mute request is no longer detected.

3. The method of claim 1, wherein each of the plurality of signal sources occasionally transmits a test tone on the at least one audio signal bus, and wherein at least some of the plurality of signal sources receive the test tone.

4. In a communication system network that comprises a plurality of communication systems and a processing multiplexer, wherein each of the plurality of communication systems is operably associated with the processing multiplexer by at least one source interface bus having a plurality of TDM slots and at least one sink interface bus having a plurality of TDM slots, wherein each of the plurality of communication systems comprises:

a plurality of signals destinations;
   a plurality of signal sources, wherein at least some of the signal sources produce representations of audio signals;
   at least one audio signal bus, operably associated with the plurality of signal sources, having a plurality of TDM slots, wherein each of the plurality of TDM slots carries information pertaining to the representation of audio signals for one of the plurality of signals sources; and
   processing multiplexer interface means, operably associated with the at least one audio signal bus and the plurality of signal sources, for placing at least some of the representations of audio signals onto the source interface bus such that the at least some of the representations of audio signals are supplied to the processing multiplexer;

wherein, for each communication system, the at least one source interface bus has a corresponding TDM slot for each of the plurality of TDM slots of the at least one audio signal bus, and wherein the processing multiplexer processes the at least some of the representations of audio signals and routes, via the sink interface bus, processed signals to at least some of the plurality of signal destinations, wherein the processing multiplexer interface means of each of the plurality of communication systems is improved to comprise:

mute request detection means for detecting a mute request and for determining determining which of the plurality of TDM slots of the at least one audio signal bus the mute request is for to produce a determined TDM slot; and
   null-audio signal injection means, operably associated with the mute request detection means, for injecting a null-audio signal into the determined TDM slot's corresponding TDM slot of the at least one source interface bus with negligible affects on the information pertaining to the representation of audio signals contained within the determined TDM slot when the mute request is detected by the mute request detection means.

5. In the communication system network of claim 4, each of the improved processing multiplexer interface means further comprises means, operably associated with the mute request detection means, for detecting when the mute request has been removed.

6. In the communication system of claim 4, wherein the mute request comprises a test tone that is produced by at least one of the plurality of signal sources.

* * * * *